Jan. 26, 1971 H. VOIGT ET AL 3,557,530
PROCESS FOR THE SEPARATION OF ACETYLENE FROM GASES OBTAINED BY PYROLYSIS
Filed Jan. 21, 1970
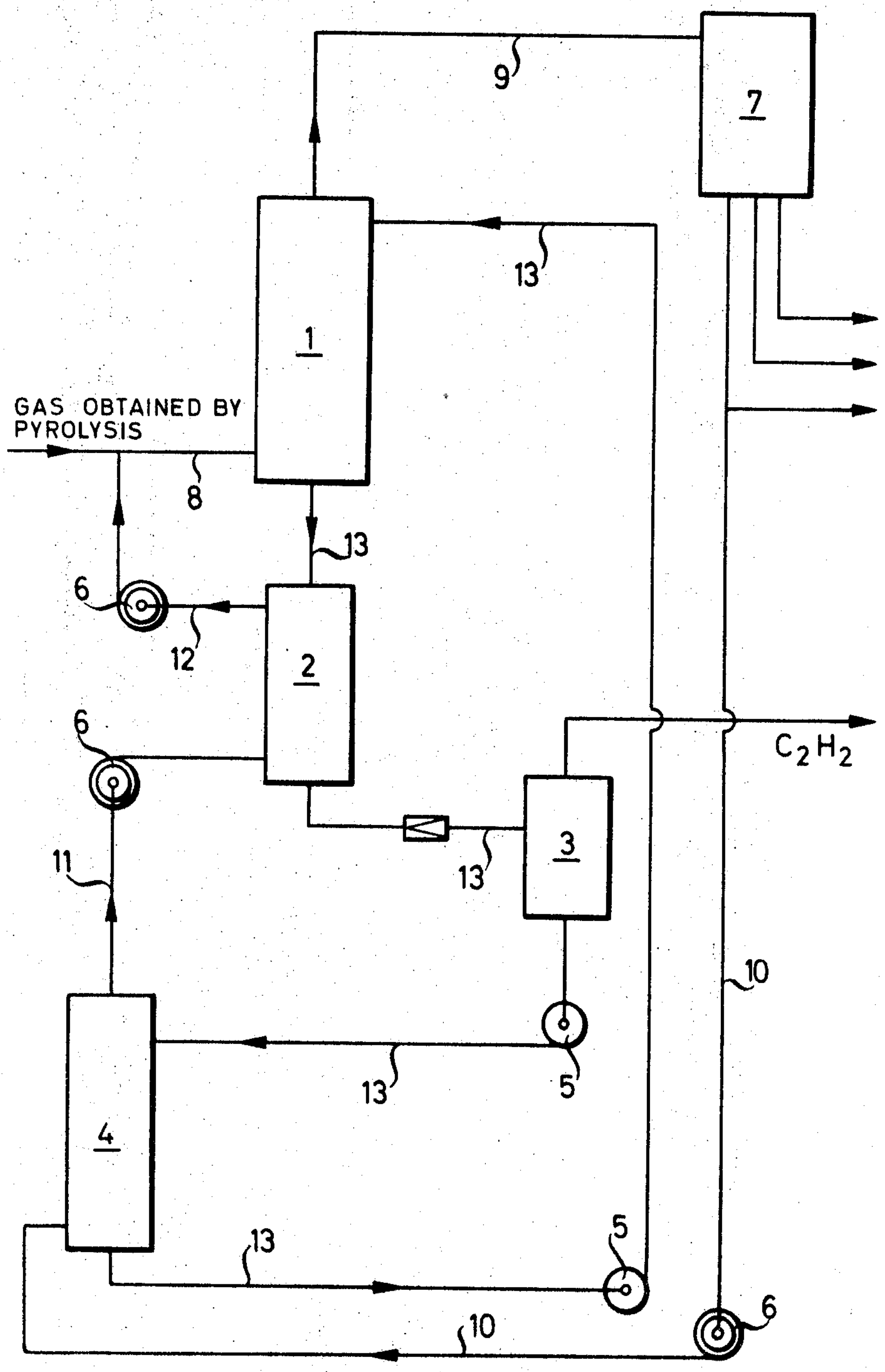
INVENTORS
HARTMUT VOIGT
EGON MALOW
WALTER WETZEL
ERICH SCHNECK
BY Curtis, Morris & Safford
ATTORNEYS United States Patent Office 3,557,530
Patented Jan. 26, 1971

1

3,557,530

PROCESS FOR THE SEPARATION OF ACETYLENE FROM GASES OBTAINED BY PYROLYSIS

Hartmut Voigt, Frankfurt am Main, Egon Malow, Hofheim, Taunus, and Walter Wetzel and Erich Schneck, Frankfurt am Main, Germany, assignors to Farbwerke Hoechst Aktiengesellschaft vormals Meister Lucius & Bruning, Frankfurt am Main, Germany, a corporation of Germany Filed Jan. 21, 1970, Ser. No. 4,710
Claims priority, application Germany, May 21, 1969, 1,925,731
Int. Cl. B01d 19/00
U.S. Cl. 55—64 5 Claims

ABSTRACT OF THE DISCLOSURE

Process for the separation of acetylene from gases obtained by pyrolysis by absorption by means of a high-boiling solvent which absorbs acetylene selectively and by subsequent desorption, in which the portions of the gas components absorbed by the solvent are again expelled in several stages, partly with the use of stripping gases.

The present invention relates to a process for the separation of acetylene from carrier gases, which are formed in the pyrolysis of hydrocarbons, by absorption by means of a high-boiling solvent which absorbs acetylene selectively, and by subsequent desorption, in which the portions of the gas components absorbed by the solvent are again expelled in several stages, partly with the use of stripping gases.

The absorption is carried out in this process and in similar known processes under pressures ranging from 10 to 20 atmospheres absolute which depends on the properties of the solvent; the operational temperatures generally lie within the range of from +30° to −60° C. Under these conditions even highly selective solvents, such as dimethyl formamide and n-methyl pyrrolidone, absorb, in addition to acetylene, still other constituents of the carrier gas. These portions which mainly consist of carbon dioxide, ethylene and methane, are expelled in a first desorbing stage, frequently with the use of a fractionating desorber-absorber column while rescrubbing the acetylene and are recycled, after being compressed, into the absorbing stage.

The operational pressure of the desorber-absorber column (also called "reboiled absorber") generally lies within the range of from 0.3 to 5 atmospheres gage, the lower pressures being preferred. Boiling in the reboiled absorber, rescrubbing the acetylene and finally compressing the expelled gases entail a considerable expenditure of energy even when the operations in this absorber, as is well-known, are assisted by the introduction of a stripping gas. The expenditure on apparatus to carry out this process step is especially high.

In the next desorbing stage the acetylene is set free by heating the solvent one or several times. The solvent is finally completely regenerated by boiling, preferably under low pressures. Inasmuch as a stripping gas had hitherto been used to carry out the regeneration, it was in most cases blown off unused together with the considerable acetylene residue.

The complete regeneration of the dimethyl formamide preferably used in the known processes by heating entails considerable disadvantages since the process must be carried out at a temperature level which necessitates a corresponding expenditure of energy and accelerates the decomposition of the solvent.

2

It is the object of the present invention to overcome the disadvantages of the process described above, especially to reduce the expenditure of energy and an apparatus for carrying through the process and to avoid the losses of acetylene with the stripping gas.

Now we have found a process for the separation of acetylene from ethylene-containing gaseous mixtures obtained by the pyrolysis of hydrocarbons, by absorption by means of a high-boiling solvent absorbing acetylene selectively and by a multistage desorption following thereafter, with the use of stripping gases, which comprises recycling the stripping gas through the regenerating stage for the solvent, through the first desorbing stage, then through the absorbing stage and from there by way of the ethylene separating installation to the regenerating stage.

The special advantage of the process according to the invention is that with the use of this gas a loss of acetylene can be entirely avoided owing to the special method of conducting the stripping gas through the individual process stages.

Another important advantage of the process is the reduction of the losses of solvent since the solvent tension removed together with the stripping gas is recovered without an additional process step together with the head product of the absorber.

As stripping gas there may be used foreign gases which cannot be absorbed by the solvent under the prevailing operational conditions and which do not react chemically with the gas components. However, it is especially advantageous to use the light residual gas from the pyrolysis zone which is anyhow obtained in the separating installation for ethylene disposed after the acetylene production plant.

The process of the invention only puts slight thermal strain on the solvent. For the desorbing and regenerating stages considerably higher pressures may be applied than in the hitherto proposed processes, the recompression energy being essentially reduced thereby. The "reboiled absorber" may be replaced by a simple desorber. The demand for energy in the process steps for separating the acetylene amounts in many cases only to about one-third of the demand of the conventional processes in which acetone is used as the solvent, and to about half the demand for energy of the known processes in which dimethyl formamide is used as the solvent, when these processes are operated under very low desorption pressures and with the use of so-called "reboiled absorbers." An essential advantage of the process of the present invention over the known processes resides, furthermore, in the fact that the decrease in the acetylene gas concentration in the first desorbing stage improves the safety of operation.

When using dimethyl formamide as the solvent, the influences of a carefully applied thermal strain become especially apparent. However, other solvents, for example N-methyl pyrrolidone, may also be used.

Especially advantageous pressure ranges for the complete regeneration of the solvent are situated within the range of 0.2 to 0.9 times the pressure prevailing in the absorbing stage. The pressure in the first desorbing stage may be 1.05 times that of the absorbing stage, however, the pressure may also be maintained at a lower level; it is advantageous to apply pressures down to 0.5 times the pressure prevailing in the absorbing stage. The pressure in the first desorbing stage shall at any rate be higher than that in the regenerating stage.

In the accompanying drawing, the method and apparatus of the invention are illustrated by means of a flow sheet in which an absorber 1 is the first absorbing stage, a desorber 2 the first desorbing stage, a desorber 3 the second desorbing stage which serves to set free the acetylene product, and a desorber 4 is the regenerating stage. 5 designate pumps and 6 designate blowers. The plant "ethylene separating installation" is symbolically represented by a rectangular field 7. To simplify the drawing. the individual heat exchangers in the solvent cycle and the intercoolers in the absorber are not shown in the flow sheet. 8, 9, 10, 11 and 12 denote the conduits for the circulation of the stripping gas, whereas 13 denote the conduits for the solvent.

The gas obtained by pyrolysis is conveyed by way of conduit 8 to the absorbing stage 1 together with the recycled residual gas from the pyrolysis zone and/or the stripping gas from another source. The portions of the gas obtained by pyrolysis which are not absorbed by the solvent in the absorbing stage and which are free from acetylene, are conveyed by way of conduit 9 to separating installation 7.

In addition to ethylene, hydrogen, methane and other byproducts a residual gas is obtained in this separating installation which is conveyed as stripping gas, free from acetylene and ethylene, by way of conduit 10 through regenerating stage 4, then the gas is conveyed with the acetylene-containing gaseous portions desorbed in this stage by way of conduit 11 and a blower 6 to the first desorbing stage 2 and by way of conduit 12 (if necessary by way of a second blower 6) into the stream of gas obtained by pyrolysis which is conveyed to the absorber. The stripping gas is conducted in a cycle which, however, does not include the second desorbing stage 3, in which the acetylene is set free.

The solvent which may be, for example, dimethyl formamide, is also conducted in a cycle. It is conveyed, completely regenerated, to absorbing stage 1, it absorbs preferably acetylene and, in addition, some more sparingly soluble gases, which latter are then again desorbed (apart from slight residues) in the first desorbing stage 2. The acetylene is set free in the second desorbing stage 3, with the supply of heat, under pressures ranging from 1.1 to 1.3 atmospheres absolute and are thus considerably lower than those prevailing in the other desorbing stages. The solvent is then recycled to the absorber by way of regenerating stage 4.

Fresh amounts of solvent are fed to the solvent cycle to replenish losses of solvent. The circulating amount of residual gas is suitably maintained at an approximately constant value by expelling a partial amount thereof.

The following examples illustrate the invention.The term "Nm.$^3$" is used in the examples to mean cubic meters measured under normal conditions of temperature and pressure.

EXAMPLE 1

20,000 Nm.$^3$/hour of a gas obtained by pyrolysis, which contained hydrogen, CO, methane, ethylene, carbon dioxide and acetylene, were introduced under a pressure of 19 atmospheres absolute and at a temperature of 0° C. into absorber 1. At the head of absorber 1 were introduced 40 tons/hour of dimethyl formamide having a temperature of −5° C. The temperature at which the solvent was discharged from the absorber was adjusted at +18° C. by intermediate cooling. The solvent was conveyed adiabatically and likewise under a pressure of 19 atmospheres absolute through first desorbing stage 2. In that process the solvent cooled to 11° C. and then served to cool the regenerated solvent. The head product of this stage was conveyed without a blower to absorber 1. In the second desorbing stage 3 the pressure of the solvent was released to 1.2 atmospheres absolute and the solvent was heated at 120° C. whereby the acetylene product was set free. It contained only traces of carbon dioxide and ethylene. The solvent was freed of acetylene to a large extent was then pumped into regenerating stage 4 through which it was conveyed adiabatically under a pressure of 17 atmospheres absolute. 5,000 Nm.$^3$/hour of residual gas were conveyed to the regenerating stage, said gas being available from separating plant 7 under a pressure of 17 atmospheres absolute so that a blower could be dispensed with also in this case. The gas obtained at the head of the regenerating stage was compressed by means of a blower from 17 to 19 atmospheres absolute and conveyed to the sump of the first desorbing stage 2. During this operation, the admissible acetylene partial pressure was not exceeded since the decomposition of the acetylene was prevented owing to the high partial pressure of the inert stripping gas.

EXAMPLE 2

20,000 Nm.$^3$/hour of a gas obtained by pyrolysis which contained hydrogen, carbon monoxide, methane, ethylene and acetylene (thus being free of carbon dioxide) were introduced under the same conditions into the same apparatus as described in Example 1. Dimethyl formamide was introduced in an amount of 35 tons/hour. Desorbing stages 2 and 3 operate in the manner as described in Example 1. However, only 2,500 Nm.$^3$/hour of stripping gas were required for the desorption of the ethylene being dissolved concomitantly. To enable a sufficient regeneration of the solvent to be carried out with the reduced amount of stripping gas in desorbing stage 4, said desorbing stage had to be operated under a pressure of 8 atmospheres absolute and at a temperature of 120° C.

We claim:

1. A process for the separation of acetylene from carrier gases formed in the pyrolysis of hydrocarbons, by absorption by means of a high-boiling solvent absorbing acetylene selectively, and by subsequent desorption in which the portions of the gas components absorbed by the solvent are expelled in several stages, partially with the use of stripping gases, which comprises recycling the stripping gas first through the regenerating stage for the solvent, then through the first desorbing stage, then through the absorbing stage and finally from there by way of the separating installation for the head product of the absorbing stage to the regenerating stage.

2. The process as claimed in claim 1, in which residual gas from the pyrolysis zone is used as the stripping gas.

3. The process as claimed in claim 1 in which dimethyl formamide is used as the solvent.

4. The process as claimed in claim 1 in which operational pressures are used in the regenerating stage which are 0.2 to 0.9 times that of the operational pressure in the absorbing stage.

5. The process as claimed in claim 1 in which the operational pressure of the first desorbing stage is 0.5 to 1.05 times that of the operational pressure in the absorbing stage.

References Cited

UNITED STATES PATENTS

| | | | |
|---|---|---|---|
| 2,762,453 | 9/1956 | Alexander | 55—64X |
| 2,870,867 | 1/1959 | Bartholome et al. | 55—43 |

SAMIH N. ZAHARNA, Primary Examiner

R. W. BURKS, Assistant Examiner

U.S. Cl. X.R.

55—43, 47